(12) United States Patent
Pritchard et al.

(10) Patent No.: US 6,222,124 B1
(45) Date of Patent: Apr. 24, 2001

(54) INTEGRATED WALL OUTLET PLATE FOR RETROFIT LOW-VOLTAGE SIGNALS

(75) Inventors: Robert C. Pritchard, Holmdel; John A. Rutkowski, Jackson, both of NJ (US)

(73) Assignee: Avaya Technology Corp., Basking Ridge, NJ (US)

( * ) Notice: Subject to any disclaimer, the term of this patent is extended or adjusted under 35 U.S.C. 154(b) by 0 days.

(21) Appl. No.: 09/339,518

(22) Filed: Jun. 24, 1999

(51) Int. Cl.[7] .................................................... H02G 3/14
(52) U.S. Cl. ............................................. 174/66; 220/241
(58) Field of Search ............................... 174/66; 220/241

(56) References Cited

U.S. PATENT DOCUMENTS 2,320,400 * 6/1943 Bedell ................................. 220/3.6
5,114,365    5/1992 Thompson et al. .
5,221,814 * 6/1993 Colbaugh et al. ..................... 174/66

\* cited by examiner

*Primary Examiner*—Dean A. Reichard
*Assistant Examiner*—Angel R. Estrada

(57) ABSTRACT

An integrated wall outlet plate includes a faceplate having a front side and a rear side. A plurality of connectors is integrally formed with the faceplate, each of the connectors extending through the faceplate from the front side to the rear side. Mounting means are positioned on the rear side of the faceplate, for mounting the outlet plate in a wall. The connectors can be of various types, including, but not limited to, coaxial cable connectors, telephone wire connectors, loudspeaker wire connectors, and RCA-type audio/video connectors.

15 Claims, 3 Drawing Sheets

INTEGRATED WALL OUTLET PLATE FOR RETROFIT LOW-VOLTAGE SIGNALS

FIELD OF THE INVENTION

The present invention relates to wall outlet plates, and, more particularly, to an integrated wall outlet plate, faceplate, and electrical box for use with low-voltage signals.

BACKGROUND OF THE INVENTION

As advanced voice, data, and video services evolve, homeowners are faced with the prospect that the existing wiring in their houses is not adequate to distribute the services throughout the house. Either the cabling system does not perform well enough, or there is no outlet where the service is to be used, or both. In either case, homeowners must retrofit new cables into their houses in order to take advantage of the new services. Aside from pulling cables through the walls, this type of cabling retrofit often involves installing new electrical boxes, outlets, and faceplates at all locations where outlets are desired.

Nearly all electrical boxes, outlets, and faceplates are designed and optimized for use in new construction. While there are some products that are specifically designed for retrofit (sometimes called "old work") application, these products are designed to replace only one of the three components (i.e., the electrical box, the outlet, or the faceplate). All three components are needed and must be assembled on site during installation. Examples of existing products for use in a retrofit installation include retrofit electrical boxes, which use standard outlets and faceplates, and a combination outlet and faceplate, which must be used with an electrical box.

Installations using products of this type generally involve the following steps: a hole is cut in the wall, a cable is pulled through the hole, the cable is terminated (i.e., a connector is installed on the end of the cable), the cable is passed through a retrofit electrical box, the electrical box is attached to the wall, the cable terminations are connected to the outlet, the outlet is installed into the electrical box, and the faceplate is installed onto the outlet. When this process has to be repeated for every outlet that is to be installed, it becomes a labor-intensive, time consuming, and expensive undertaking.

SUMMARY OF THE INVENTION

An integrated wall outlet plate constructed in accordance with the present invention includes a faceplate having a front side and a rear side. A plurality of connectors is integrally formed with the faceplate, each of the connectors extending through the faceplate from the front side to the rear side. Mounting means are positioned on the rear side of the faceplate, for mounting the outlet plate in a wall.

By combining the three components (electrical box, outlet, and faceplate) into a single component, and by optimizing the design for use in retrofit installations, the disadvantages of the prior art are easily overcome. Installing the integrated wall outlet plate requires fewer steps: a hole is cut in the wall, the cable is pulled through the hole, the cable is terminated, the cable terminations are connected to the integrated outlet plate, and the integrated outlet plate is installed in the wall. This integrated design shortens the installation time required for each outlet, thereby resulting in lower total installation time and costs.

Since the integrated wall outlet plate is designed without an enclosed electrical box, it may not be suitable for use in connection with high voltage cables (i.e., 110 volt AC power). This is because existing electrical regulations require that high voltage cables must be enclosed within an electrical box for safety reasons. Additionally, the integrated wall outlet plate is not optimal for use in new construction, where the cables are installed before the wall is in place.

BRIEF DESCRIPTION OF THE DRAWINGS

For a better understanding of the present invention, reference is made to the following detailed description of an exemplary embodiment considered in conjunction with the accompanying drawings, in which.

DETAILED DESCRIPTION OF THE DRAWINGS

Figure 1:
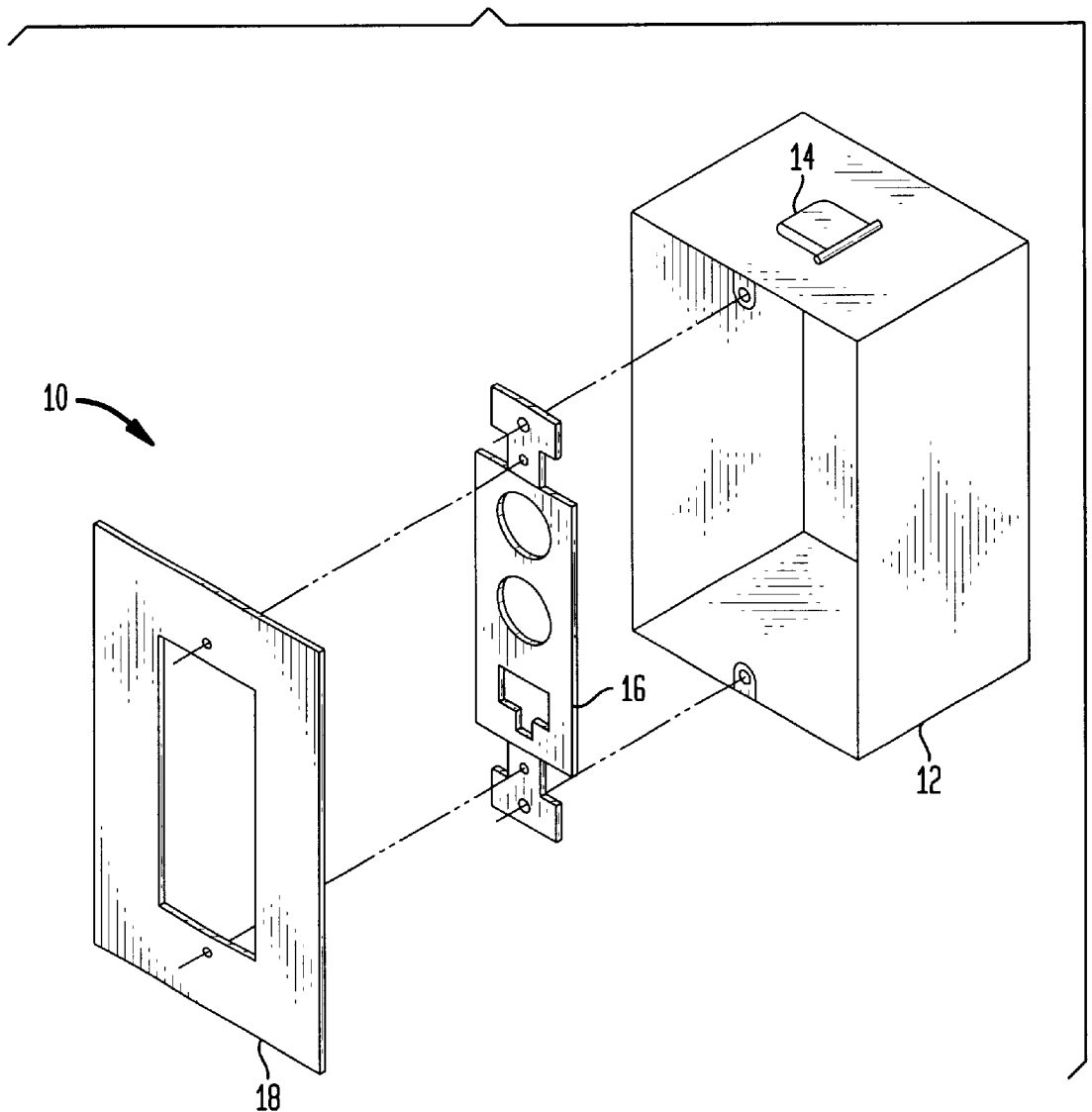
FIG. 1 is an exploded perspective view of typical prior art components.

FIG. 1 shows an installation 10 that is typical of prior art devices, including an electrical box 12 having a clamp 14, an outlet 16, and a faceplate 18. The installation process with the installation 10 is as follows: a hole is cut in a wall (not shown), a cable (not shown) is pulled through the hole, and the cable is terminated and passed into the electrical box 12. The electrical box 12 is then attached to the wall and is secured in place by the clamp 14, which is pivoted into an upright position such that the clamp 14 contacts the rear side of the wall. The cable terminations are connected to the outlet 16, the outlet 16 is attached to the electrical box 12, and the faceplate 18 is attached to the outlet 16.

Performing minor adjustments to the alignment of the outlet 16, for example, to straighten it or to align it with other outlets on the same wall, becomes rather involved. First, the faceplate 18 must be removed from the outlet 16. Then the necessary adjustments are made to the outlet 16 relative to the electrical box 12. Finally, the faceplate 18 is replaced on the outlet 16.

Figure 2:
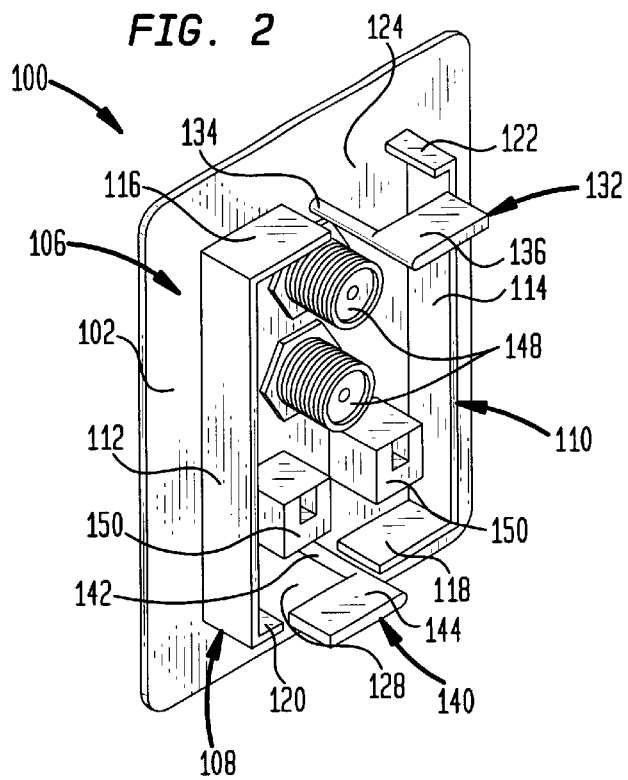
FIG. 2 is a rear perspective view of an integrated wall outlet plate constructed in accordance with the present invention.
Figure 3:
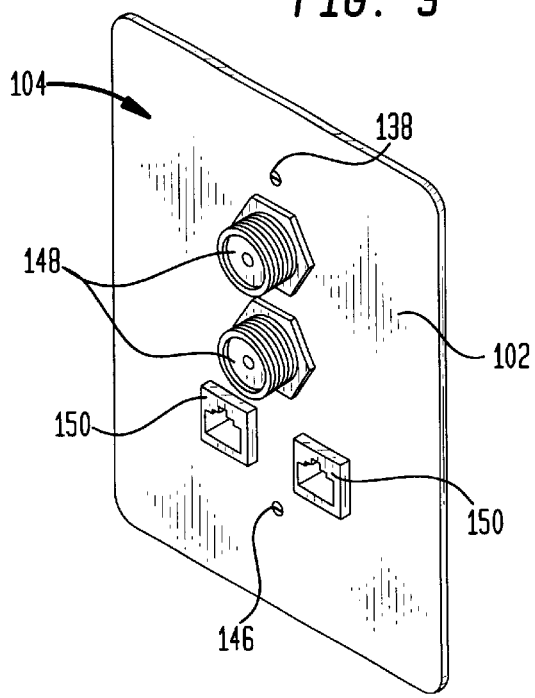
FIG. 3 is a front perspective view of the integrated wall outlet plate shown in FIG. 2.

Referring now to FIGS. 2 and 3, an integrated wall outlet plate 100 includes a faceplate 102 with a front side 104 and a rear side 106. A pair of flanges 108, 110 is located on the rear side 106 and cooperate to form a generally rectangular boundary. The flanges 108, 110 each respectively include a vertical leg 112, 114, a long horizontal leg 116, 118, and a short horizontal leg 120, 122. The long horizontal leg 116 of the flange 108 and the short horizontal leg 122 of the flange 110 delimit an upper opening 124. An upper hole 126 (see FIG. 4) is located adjacent to the upper opening 124 and extends through the faceplate 102 from the front side 104 to the rear side 106. The short horizontal leg 120 of the flange 108 and the long horizontal leg 118 of the flange 110 delimit a lower opening 128. A lower hole 130 (see FIG. 4) is located adjacent to the lower opening 128 and extends through the faceplate 102 from the front side 104 to the rear side 106.

An upper clamp 132 has an internally threaded stem 134 and a blade 136. An upper screw 138 passes through the upper hole 126 from the front side 104 of the faceplate 102 and engages the internal threads of the stem 134 of the upper clamp 132 at the rear side 106 of the faceplate 102. A lower clamp 140 includes an internally threaded stem 142 and a blade 144. A lower screw 146 passes through the lower hole 130 from the front side 104 of the faceplate 102 and engages the internal threads of the stem 142 of the lower clamp 140 at the rear side 106 of the faceplate 102.

Two coaxial cable connectors 148 and two telephone wire connectors 150 are positioned inside the boundary of the flanges 108, 110. On both the front side 104 and the rear side 106, the coaxial connector 148 is female, therefore requiring a male-terminated wire connection. The telephone wire connector 150 is female on the front side 104 and hard-wired on the rear side 106. The number and positioning of the connectors 148, 150 can be varied according to the intended use of the outlet plate 100.

Figure 4:
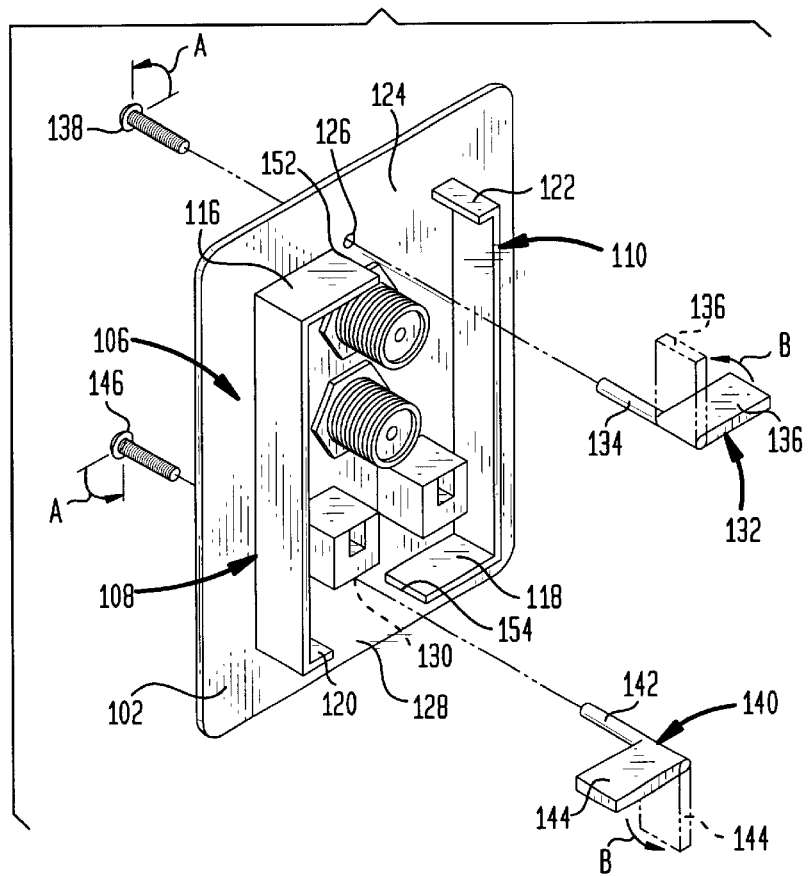
FIG. 4 is a partially exploded rear perspective view of the integrated wall outlet plate shown in FIG. 2.
Figure 5:
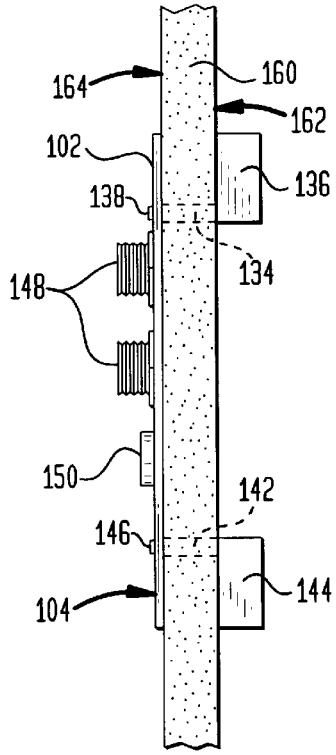
FIG. 5 is a cross-sectional side view of the integrated wall outlet plate shown in FIG. 2 installed in a wall.

FIGS. 4 and 5 illustrate how the outlet plate 100 is installed. First, a hole is cut in a wall 160; for purposes of properly sizing the hole, the flanges 108, 110 can be used as guides, since only the flanges 108, 110 will be inserted into the hole and the other components of the outlet plate 100 are positioned within the boundary of the flanges 108, 110. The appropriate cables are pulled through the hole in the wall 160 and are connected to the corresponding connectors 148, 150 on the rear side 106 of the faceplate 102. The outlet plate 100 is then inserted into the hole in the wall 160.

The blade 136 of the upper clamp 132 and the blade 144 of the lower clamp 140 are in a horizontal position when the outlet plate 100 is installed in the wall 160. Once the flanges 108, 110 have passed through the hole in the wall 160, the blades 136, 144 are positioned behind a rear side 162 of the wall 160. The screws 138, 146 are turned in the direction of the arrows A, thereby rotating the blades 136, 144 of the clamps 132, 140, respectively, by 90° into a vertical position as shown by the arrows B and the phantom lines.

The blade 136 of the upper clamp 132 is rotated into an upwardly oriented vertical position until it contacts an edge 152 of the long horizontal leg 116 of the flange 108 adjacent the upper opening 124. In this position, a portion of the blade 136 of the upper clamp 132 extends through the upper opening 124 and above the long horizontal leg 116 of the flange 108 and the short horizontal leg 122 of the flange 110. In a similar manner, the blade 144 of the lower clamp 140 is rotated into a downwardly oriented vertical position until it contacts an edge 154 of the long horizontal leg 118 of the flange 110 adjacent the lower opening 128. In this position, a portion of the blade 144 of the lower clamp 140 extends through the lower opening 128 and below the short horizontal leg 120 of the flange 108 and the long horizontal leg 118 of the flange 110.

Further turning of the screws 138, 146 threads the screws 138, 146 further into the stems 134, 142, thereby drawing the blades 136, 144 toward the rear side 162 of the wall 160 axially along the screws 138, 146. When the screws 138, 146 are fully tightened, the blades 136, 144 abut the rear side 162 of the wall 160, and the rear side 106 of the faceplate 102 sits flush against a front side 164 of the wall 160. The blades 136, 144 and the rear side 106 of the faceplate 102 act together to surround the portion of the wall 160 which bounds the hole, thereby securing the outlet plate 100 in position. Jumper cables (not shown) can then be attached to the appropriate connectors 148, 150 on the front side 104 of the faceplate 102 to provide the corresponding services to the room.

By using the clamps 132, 140, it is possible to easily adjust the position of the outlet plate 100 in the wall 160 after installation, for example to align the outlet plate 100 with other nearby outlet plates, by permitting minor movements of the outlet plate 100 around the boundaries of the hole in the wall 160. Such movements can easily be made by loosening the screws 138, 146, which loosens the blades 136, 144 from the rear side 162 of the wall 160. The range of movement of the outlet plate 100 is dependent upon the size of the hole in the wall 160. Once the outlet plate has been repositioned, the screws 138, 146 are retightened, thereby securing the outlet plate 100 in its new position.

A popular connector configuration of the outlet plate 100 is as shown in the Figures, with two coaxial cable connectors 148 and two telephone wire connectors 150. The coaxial connectors 148 are located above the telephone connectors 150 to provide easy access to the coaxial connectors, which permits easy installation and removal of jumper cables. It is possible to angle the coaxial connectors 148 in a vertical and/or horizontal direction relative to the faceplate 102. The benefit of providing the coaxial connectors 148 at an angle is to permit furniture to be placed closer to the front side 164 of the wall 160, since the clearance required for the jumper cables would be reduced due to less bending of each jumper cable. If the coaxial connectors 148 are angled, the telephone connectors 150 can also be angled relative to the faceplate 102, to achieve a consistent and aesthetically pleasing appearance of the configuration of the connectors on the outlet plate 100.

A possible modification of the outlet plate 100 is to manufacture it at twice the width, thereby providing space for additional connectors. Two sets of upper clamps 132 and two sets of lower clamps 140 should be used with this modification in order to increase the stability of the outlet plate 100 in the wall 160. In either a single-width or a double-width outlet plate, different types of connectors could be used. For instance, connectors could be provided for loudspeaker wires or for RCA-type terminated wires for connection to audio and video components. The portion of the connectors at the rear side 106 of the faceplate 102 could be female or any type of hard-wired connection, including screw terminals, cam-actuated terminals, IDC termination, or solder-wire termination.

The flanges 108, 110 have three primary purposes: to add rigidity to the outlet plate 100, to be used as a template to draw an outline of the hole to be cut in the wall 160, and for aesthetic reasons. If the wall 160 is not perfectly flat where the outlet plate 100 is installed, there will be a gap between the front side 164 of the wall 160 and the rear side 106 of the faceplate 102. The flanges 108, 110 would obscure the cables as viewed from the side, providing a neat appearance. If such features are not desired, the flanges 108, 110 can be omitted in an alternate embodiment of the outlet plate 100.

It is also possible to orient the flanges 108, 110 such that the openings 124, 128 are located at the sides of the outlet plate 100, as opposed to the upper and lower ends. In such an alternate embodiment, it would also be necessary to reposition the clamps 132, 140 to align them with the openings 124, 128. Placing the openings 124, 128 at the sides may also require a different arrangement of the connectors 148, 150 than shown in the Figures, to allow sufficient space for the clamps 132, 140 to be rotated between their horizontal and vertical positions.

It will be understood that the embodiment described herein is merely exemplary and that a person skilled in the art may make many variations and modifications without departing from the spirit and scope of the present invention. For example, it is possible to provide terminators for the coaxial connectors 148, in case there are no jumper cables connected at the front side 104. Ideally, such a terminator would include a pin incorporating a low voltage resistor to provide electrical termination for the signal in the corresponding coaxial cable. Additionally, the blades 136, 144 of the clamps 132, 140 can be of almost any shape, provided that the blade shape is such that the clamps can be rotated into a position in which the blades can grip the rear side 162 of the wall 160. All such variations and modifications are intended to be included within the scope of the invention as defined in the appended claims.

What is claimed is:

1. A wall outlet plate, comprising:
   a faceplate having a front side and a rear side;
   a plurality of connectors extending though said faceplate from said front side to said rear side, said connectors being integrally formed with said faceplate;

mounting means for mounting said outlet plate in a wall, said mounting means being located on said rear side of said faceplate; and rigidifying means for rigidifying said wall outlet plate, said rigidifying means including at least one flange extending away from said rear side of said faceplate, said at least one flange including a first flange, which extends away from said rear side of said faceplate, and a second flange, which extends away from said rear side of said faceplate, and said first and second flanges being spaced apart to form a generally rectangular boundary having a first opening and a second opening.

2. A wall outlet plate according to claim 1, wherein said mounting means includes a first clamp movable between a first position, in which said first clamp is contained within the rectangular boundary of said first and said second flanges such that said outlet plate can be installed into a hole in the wall, and a second position, in which said first clamp extends through the rectangular boundary via said first opening, whereby when said first clamp is in its said second position, the wall is gripped between said rear side of said faceplate and said first clamp; and a second clamp movable between a first position, in which said second clamp is contained with the rectangular boundary of said first and second flanges such that said outlet plate can be installed into the hole in the wall, and a second position, in which said second clamp extends through the rectangular boundary via said second opening, whereby when said second clamp is in its said second position, the wall is gripped between said rear side of said faceplate and said second clamp.

3. A wall outlet plate according to claim 2, wherein said first clamp is stopped in its said second position by an edge of said first flange adjacent to said first opening; and said second clamp is stopped in its said second position by an edge of said second flange adjacent to said second opening.

4. A wall outlet plate according to claim 3, wherein said mounting means further includes a first screw attached to said first clamp, such that when said first screw is turned, said first clamp moves from its said first position to its said second position, further turning of said first screw drawing said first clamp axially along said first screw toward the wall, thereby gripping the wall between said rear side of said faceplate and said first clamp; and a second screw attached to said second clamp, such that when said second screw is turned, said second clamp moves from its said first position to its said second position, further turning of said second screw drawing said second clamp axially along said second screw toward the wall, thereby gripping the wall between said rear side of said faceplate and said second clamp.

5. A wall outlet plate according to claim 3, wherein said first flange includes a vertical leg, a long horizontal leg, and a short horizontal leg;

said second flange includes a vertical leg, a long horizontal leg, and a short horizontal leg;

said first opening is formed between said long horizontal leg of first flange and said short horizontal leg of said second flange; and said second opening is formed between said long horizontal leg of said second flange and said short horizontal leg of said first flange.

6. A wall outlet plate according to claim 1, wherein said mounting means includes a first clamp movable between a first position, in which said first clamp is oriented such that said outlet plate can be installed into a hole in the wall, and a second position, in which said first clamp is oriented such that the wall can be gripped between said rear side of said faceplate and said first clamp; and a second clamp movable between a first position, in which said second clamp is oriented such that said outlet plate can be installed into the hole in the wall, and a second position, in which said second clamp is oriented such that the wall can be gripped between said rear side of said faceplate and said second clamp.

7. A wall outlet plate according to claim 6, wherein said mounting means further includes a first screw attached to said first clamp, such that when said first screw is turned, said first clamp moves from its said first position to its said second position, further turning of said first screw drawing said first clamp axially along said first screw toward the wall, thereby gripping the wall between said rear side of said faceplate and said first clamp; and a second screw attached to said second clamp, such that when said second screw is turned, said second clamp moves from its said first position to its said second position, further turning of said second screw drawing said second clamp axially along said second screw toward the wall, thereby gripping the wall between said rear side of said faceplate and said second clamp.

8. A wall outlet plate according to claim 1, wherein each of said plurality of connectors includes a female connection on said front side of said faceplate.

9. A wall outlet plate according to claim 8, wherein said plurality of connectors includes two coaxial cable connectors and two telephone wire connectors.

10. A wall outlet plate according to claim 8, wherein said plurality of connectors includes a coaxial cable connector.

11. A wall outlet plate according to claim 8, wherein said plurality of connectors includes a telephone wire connector.

12. A wall outlet plate according to claim 8, wherein said plurality of connectors includes a loudspeaker wire connector.

13. A wall outlet/plate late according to claim 8, wherein said plurality of connectors includes an audio/video connector.

14. A wall outlet plate comprising:

a faceplate having a front side and a rear side;

a plurality of connectors extending though said faceplate from said front side to said rear side, said connectors being integrally formed with said faceplate, each of said connectors including a female connection on said rear side of said faceplate; and mounting means for mounting said outlet plate in a wall, said mounting means being located on said rear side of said faceplate.

15. A wall outlet plate comprising:

a faceplate having a front side and a rear side;

a plurality of connectors extending though said faceplate from said front side to said rear side, said connectors being integrally formed with said faceplate, each of said connectors including a hard-wired connection on said rear side of said faceplate; and mounting means for mounting said outlet plate in a wall, said mounting means being located on said rear side of said faceplate.

* * * * *